C. H. CHADBOURN.
HARVESTER.
No. 188,002. Patented March 6, 1877.
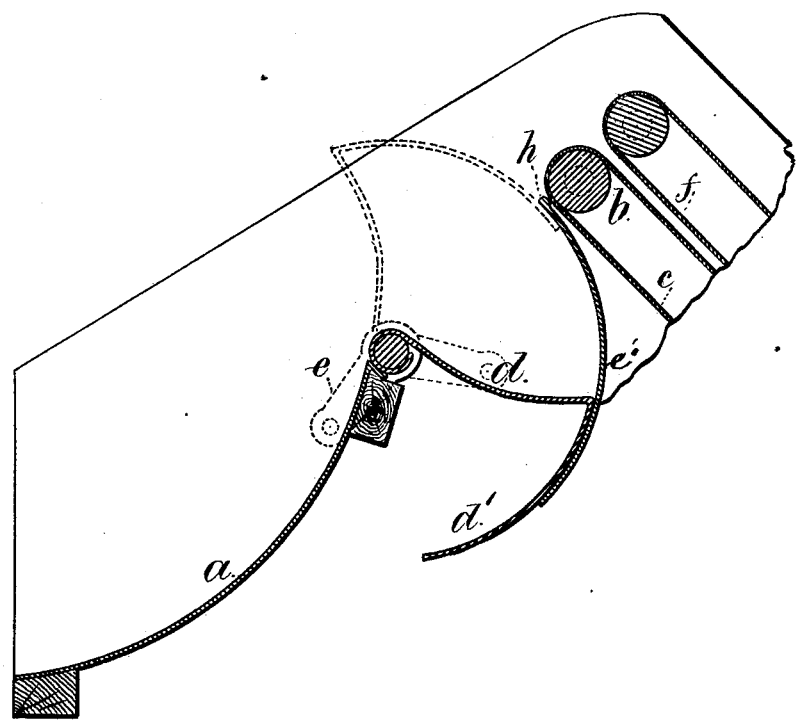
Witnesses,
Chas H. Smith
Geo. T. Pinckney
Inventor.
Charles H Chadbourn
fer Lemuel W. Serrell
Atty.

UNITED STATES PATENT OFFICE.

CHARLES H. CHADBOURN, OF ROCHESTER, MINNESOTA, ASSIGNOR TO THE CHAPMAN BINDER COMPANY, OF SAME PLACE.

IMPROVEMENT IN HARVESTERS.

Specification forming part of Letters Patent No. 188,002, dated March 6, 1877; application filed September 21, 1876.

*To all whom it may concern:*

Be it known that I, CHARLES H. CHADBOURN, of Rochester, in the county of Olmsted and State of Minnesota, have invented an Improvement in Delivery-Platforms for Grain-Binders, of which the following is a specification:

Grain-binding machines have been made in which the elevator delivers the grain upon an inclined or horizontal platform, along which it is moved, and is stopped against a wire that is periodically carried around the bundle and twisted to secure the grain, after which the bundle is delivered, and the wire is again drawn up as the wire-carrying arm is elevated. During the wiring of the bundle the grain should be cut off or divided and kept from falling down the platform until the wire-carrying arm is drawn up. This has been done by fingers falling near the top of the inclined platform, and other devices, but in practice a difficulty arises in consequence of the straw forming a thin layer all over the platform, through which the wire-carrying arm or needle has to penetrate, and in so doing the parts are liable to become clogged and obstructed.

The object of my invention is to make a cut-off and retain the grain upon the swinging section while the bundle is being wired in the harvester or reaping-machine, and then deliver it upon the platform when the wire-carrying arm is raised, and to effect this in as small a space as possible.

In the drawing, I have represented my improvement by a vertical section.

The grain is conveyed from the harvester or other reaping-machine to the top of the platform $a$ by any suitable means. An endless apron, $c$, around the roller $b$, is represented as the device for performing this work, and with which my device is especially available. There may be a second apron, $f$, above the grain as it is elevated. The platform $a$ is not continuous, but it is made with a swinging section, $d$, that is pivoted or hinged at its lower edge to the platform $a$ at a point above that at which the wire-carrying arm operates to carry the wire below the grain upon the platform.

This swinging section $d$ is operated by a crank-arm, $e$, at the end thereof, having a link or connecting-rod to an arm on the rock-shaft of the wire-carrying arm, so that when the said wire-carrying arm descends the swinging section $d$ is dropped back into the position shown in the drawing, in order that the grain, as it is delivered from the elevator of a harvester or reaping-machine, may be arrested by and fall upon the said section, instead of sliding down the inclined platform, as heretofore used in some harvesters, and when the wire-carrying arm rises out of the way of the descending grain the section $d$ is then swung up. The swinging edge of the section $d$ $d'$ moves near a stationary segmental guard, $e'$, that is below the rollers of the apron, and forms one side of the recess into which the grain is received. The swinging section $d$ has a segment of a cylinder, $d'$, preferably of sheet metal, upon its moving edge, that turns as near to the lower roller $b$ of the feeding or elevator belts as is convenient, for a purpose named hereafter. When the machine is in motion it is found that the grain and straws adhere to the under belt, and are drawn into the narrow space between the stripper-bar $h$ and the under side of the belt, and they have to be drawn out by hand. In practice, my machine keeps the grain and straw clear at this point by pulling the same out.

The operation of the machine is, that while the bundle is being formed, the section $d$ is in a nearly horizontal position, and the grain falls down upon it, and accumulates. As the wire-carrying arm completes its upward motion the swinging section $d$ is raised to the position shown by dotted lines, and the grain falls upon the convex cylinder-segment $d'$, and accumulates there.

It is preferable to time the machine so that the wire-carrier descends before the hinged segment $d$ $d'$ falls back, so that there will not be any layer of grain or straw upon the platform, but it will be in a bundle at the place for binding.

During the bundling operation the segment $d$ is in the position shown in the drawing in full lines, and the grain accumulates above it, and as soon as the wire-carrying arm rises the segment $d$ is swung up again in the position shown by dotted lines, which delivers the mass of grain upon the binding-platform, and at the same time any straw that may have been partially drawn in between the apron $c$ and the stripper-bar $h$ is drawn out by and with the mass of grain as it is delivered from said platform, thus obviating the difficulty aforesaid, as well as allowing for the accumulation of a much larger bundle than heretofore practicable in this class of machines.

It will be evident that the means for moving the swinging section $d$ up and down will vary, according to the other parts of the machine; and I do not limit myself in this particular, but intend to employ whatever devices may available for moving such section.

I claim as my invention—

1. In combination with the delivery-platform $a$ of a grain-binder, the stationary segmental guard $e'$, the segment $d'$, and section $d$, hinged at the upper edge of the platform, and of corresponding width, and a crank-arm or similar means for swinging the section $d$ periodically, to deliver the grain upon the platform $a$, substantially as set forth.

2. In combination with the elevating-apron $c$ and roller $b$, the swinging section $d\ d'$ of the platform $a$, arranged substantially as specified, so that the grain is cleared from between the apron and the stripper-bar $h$ by the movement of the section $d\ d'$, substantially as set forth.

Signed by me this 13th day of September, A. D. 1876.

CHARLES H. CHADBOURN.

Witnesses:
GEO. T. PINCKNEY,
CHAS. H. SMITH.